US008285480B2

(12) United States Patent
Orr et al.

(10) Patent No.: US 8,285,480 B2
(45) Date of Patent: *Oct. 9, 2012

(54) SYSTEM AND METHOD FOR NAVIGATING A MOBILE DEVICE USER INTERFACE WITH A DIRECTIONAL SENSING DEVICE

(75) Inventors: Kevin Howard Orr, Elmira (CA); Alexander Kornilovsky, Waterloo (CA); Alexei Skarine, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,089

(22) Filed: Apr. 9, 2012

(65) Prior Publication Data
US 2012/0194424 A1  Aug. 2, 2012

Related U.S. Application Data

(63) Continuation of application No. 13/194,405, filed on Jul. 29, 2011, now Pat. No. 8,175,798, which is a continuation of application No. 12/949,278, filed on Nov. 18, 2010, now Pat. No. 8,014,940, which is a continuation of application No. 12/396,511, filed on Mar. 3, 2009, now Pat. No. 7,860,644, which is a continuation of application No. 11/068,667, filed on Feb. 28, 2005, now Pat. No. 7,519,468.

(51) Int. Cl.
*G01C 21/00* (2006.01)

(52) U.S. Cl. ........... 701/400; 701/36; 701/538; 340/990

(58) Field of Classification Search ............. 701/36, 701/400, 433, 538, 541; 340/988, 990; 345/156
See application file for complete search history.

(56) References Cited

U.S. PATENT DOCUMENTS

| | | |
|---|---|---|
| 3,752,945 A | 8/1973 | Achterberg |
| 3,876,850 A | 4/1975 | Amberny |
| 4,425,488 A | 1/1984 | Moskin et al. |
| 4,503,299 A | 3/1985 | Henrard et al. |
| 5,059,958 A | 10/1991 | Jacobs et al. |
| 5,602,566 A | 2/1997 | Motosyuku et al. |
| 5,825,353 A | 10/1998 | Will |
| 5,874,942 A | 2/1999 | Walker |
| 5,893,798 A | 4/1999 | Stambolic et al. |
| 5,907,130 A | 5/1999 | Suzuki |
| 5,995,026 A | 11/1999 | Sellers |
| 6,201,554 B1 | 3/2001 | Lands |
| 6,212,412 B1 | 4/2001 | Rogers et al. |
| 6,297,795 B1 | 10/2001 | Kato et al. |
| 6,392,634 B1 | 5/2002 | Bowers et al. |

(Continued)

FOREIGN PATENT DOCUMENTS

EP  0 760 291 A2  3/1997

(Continued)

*Primary Examiner* — Gertrude Arthur Jeanglaude
(74) *Attorney, Agent, or Firm* — Jones Day

(57) ABSTRACT

An electronic mobile device includes a display for displaying a graphical element. A tilt sensor is configured to sense first and second tilt angles of the mobile device. A processor is coupled to the display and the tilt sensor and configured to move the graphical element relative to the display in a first direction based on the first tilt angle, and to move the graphical element relative to the display in a second direction based on the second tilt angle.

20 Claims, 8 Drawing Sheets

U.S. PATENT DOCUMENTS

| | | |
|---|---|---|
| 6,466,198 B1 | 10/2002 | Feinstein |
| 6,933,923 B2 | 8/2005 | Feinstein |
| 7,519,468 B2 | 4/2009 | Orr et al. |
| 7,583,206 B2 * | 9/2009 | Volckers .................. 341/23 |
| 7,860,644 B2 | 12/2010 | Orr et al. |
| 8,175,798 B2 * | 5/2012 | Orr et al. .................. 701/400 |
| 2002/0093483 A1 | 7/2002 | Kaplan |
| 2002/0093493 A1 | 7/2002 | Michaeli et al. |
| 2002/0118168 A1 | 8/2002 | Hinckley et al. |
| 2002/0143489 A1 | 10/2002 | Orchard |
| 2002/0149567 A1 | 10/2002 | Griffin et al. |
| 2003/0006959 A1 | 1/2003 | Varanda |
| 2003/0038778 A1 | 2/2003 | Noguera |
| 2003/0076292 A1 | 4/2003 | Griffin et al. |
| 2003/0085870 A1 | 5/2003 | Hinckley |
| 2004/0077381 A1 | 4/2004 | Engstrom |

FOREIGN PATENT DOCUMENTS

| | | |
|---|---|---|
| EP | 1 473 621 A1 | 11/2004 |
| GB | 2 336 747 | 10/1999 |
| WO | 99/37025 A1 | 7/1999 |
| WO | 00/30381 A1 | 5/2000 |
| WO | 01/78055 | 10/2001 |

* cited by examiner

SYSTEM AND METHOD FOR NAVIGATING A MOBILE DEVICE USER INTERFACE WITH A DIRECTIONAL SENSING DEVICE

CROSS-REFERENCE TO RELATED APPLICATIONS

This is a continuation of U.S. application Ser. No. 13/194,405, filed Jul. 29, 2011, which is a continuation of U.S. application Ser. No. 12/949,278, filed Nov. 18, 2010 (now U.S. Pat. No. 8,014,940), which is a continuation of U.S. application Ser. No. 12/396,511, filed Mar. 3, 2009 (now U.S. Pat. No. 7,860,644), which is a continuation of U.S. application Ser. No. 11/068,667, filed Feb. 28, 2005 (now U.S. Pat. No. 7,519,468), all the above applications hereby incorporated herein by reference.

TECHNICAL FIELD

This disclosure generally relates to mobile devices, and particularly relates to manipulating graphical elements in a mobile device graphical user interface.

BACKGROUND

A graphical element within a graphical user interface may be used to scroll through lists of data, such as lists of address entries, e-mail messages, web pages, and the like. Activation of a manual input navigation device, such as a thumb wheel, generates a navigation signal to change the relative position of the graphical user element within the graphical user interface. When the list of data is large, the mobile device user may be required to spend a significant amount of time actuating the manual input navigation device to navigate through the list.

SUMMARY

Disclosed herein are systems and methods for navigating a mobile device user interface with a direction sensing device. A manual input navigation device and a sensor are utilized to manipulate graphical elements in a mobile device graphical user interface. The manual input navigation device generates an input navigation signal for altering a relative position of the graphical element in the graphical user interface, and the sensor measures a current tilt angle of the mobile device. Upon the generation of the input navigation signal, the current tilt angle is stored as a reference tilt angle. The relative position of the graphical element is altered based on the difference between the subsequent current tilt angle and the reference tilt angle.

DETAILED DESCRIPTION

Figure 2:
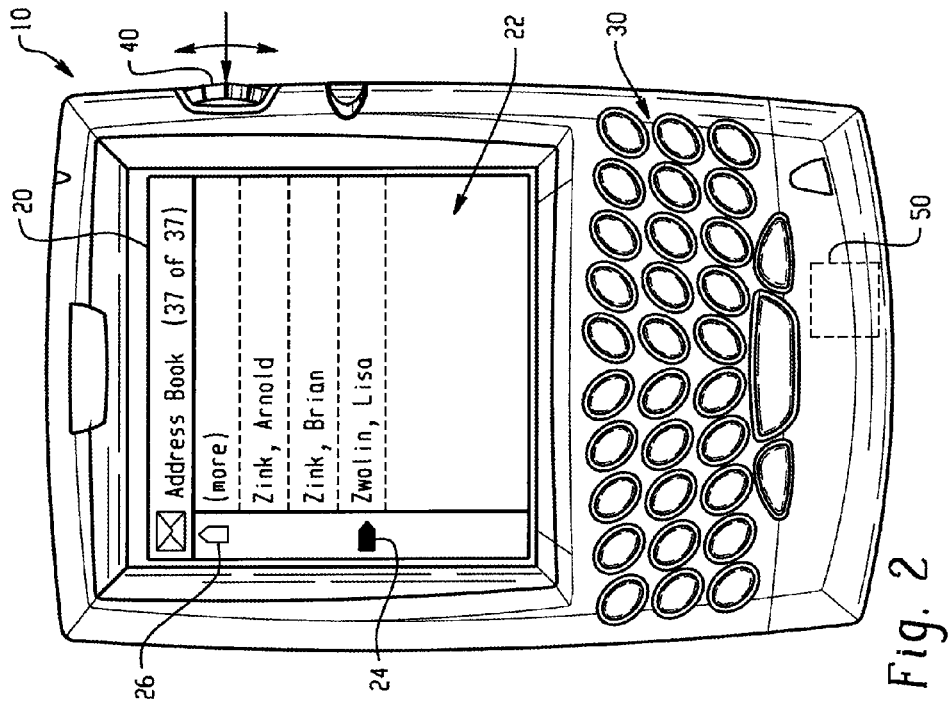
FIGS. 1 and 2 depict an example mobile device and graphical user interface.
Figure 1:
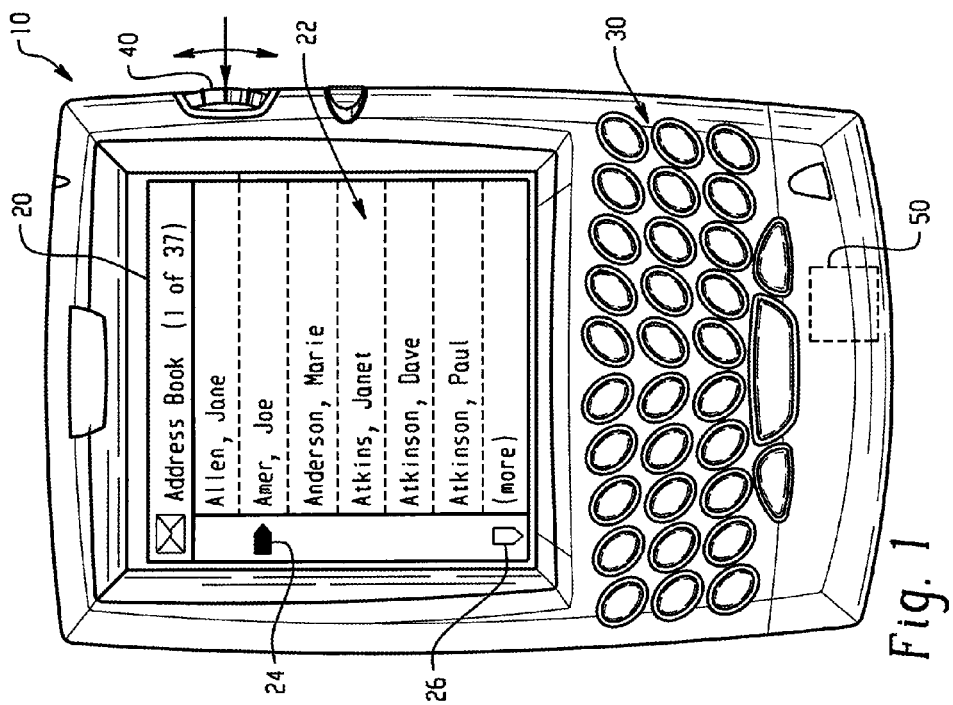

FIGS. 1 and 2 depict an example mobile device 10 and graphical user interface 22. The graphical user interface 22 is displayed on a display 20 and includes graphical elements 24 and 26. A keyboard 30 may be utilized for typical keyboard input operations, and a manual input navigation device, such as a thumb wheel 40, may be utilized for navigating the graphical user interface 22. Other manual input navigation devices may also be used, such as a touchpad, a trackball, a rocker switch, a joystick, or some other type of manual input navigation devices.

The example graphical user interface 22 comprises an address book listing of a plurality of address contacts. The graphical element 26 is used to invoke a paging function to page through the address book listing. In the example address book listing shown, a total of 37 page functions would be required to reach the end of the listing, as indicated by the page titles "1 of 37" and "37 of 37" in FIGS. 1 and 2, respectively.

The position of the graphical element 24 may be altered relative to the address book listing to select a desired contact on a particular address book page. In the example mobile device 10, the thumb wheel 40 may be rotated counterclockwise or clockwise to move the graphical element 24 up or down, respectively, within the graphical user interface 22. Actuation of the thumb wheel 40 generates an input navigation signal that is utilized by a processing subsystem in the mobile device 10 to cause the relative position of the graphical element 24 within the graphical user interface 22 to change.

The thumb wheel 40 may also be pressed inward to perform a selection operation. For example, if the user of the mobile device 10 desires to view the contact data of the address book entry entitled "Atkinson, Paul," the user would rotate the thumb wheel 40 in a clockwise direction to move the graphical element 24 down to the subject address book entry. Once the graphical element 24 is juxtaposed to the address book entry entitled "Atkinson, Paul," the user may then press the thumb wheel 40 inward to invoke another graphical user interface window that displays the subject contact data.

Selecting an address book entry already displayed on the display 20 in the graphical user interface 22 is thus a relatively quick task. If the desired address entry is not located on the current page displayed in the graphical user interface 22, however, then the user may be required to repetitively actuate the thumb wheel 40. For example, if a desired address entry is located on page 25 of 37, the user may have to repeatedly rotate the thumb wheel in a clockwise direction to page from the current page 1 to page 25. Alternatively, the user may have to select a paging operation 24 times, or invoke another graphical user interface to perform a search function.

In the example mobile device 10 of FIGS. 1 and 2, however, a sensor 50 is utilized to alter the relative position of the graphical element 24 within the graphical user interface 22. The sensor 50 is operable to generate a current tilt signal that provides indicia of the current tilt angle of the mobile device 10, and may comprise a two-axis or three-axis accelerometer. Upon the generation of the input navigation signal, the current tilt signal is stored as a reference tilt signal. Thereafter, a delta tilt signal is obtained by measuring the difference between the current tilt signal and the reference tilt signal.

Based on the value of the delta tilt signal, the mobile device 10 will generate a sensor navigation signal for altering the relative position of the graphical element 24 in the graphical user interface 22. In one embodiment, the sensor navigation signal alters the relative position of the graphical element 24 only after the value of the delta tilt signal exceeds a threshold value. For example, the sensor navigation signal may alter the relative position of the graphical element 24 only after the value of the delta tilt signal exceeds 30°.

Thus, actuation of the thumb wheel 40 in conjunction with a subsequent tilting of the mobile device 10 causes the position of the graphical element 24 relative to the graphical user interface to be altered. Further tilting of the mobile device 10 may also further alter the relative position of the graphical element 24. For example, the user may tilt the mobile device 10 in a first direction relative to the reference tilt angle to scroll down the contact list, and may tilt the mobile device 10 in an opposite direction to scroll up the contact list, and may return the mobile device 10 to the reference tilt angle to maintain the position of the graphical element 24 in the graphical user interface 22.

In another embodiment, the current tilt signal is stored as a reference tilt signal upon each actuation of the thumb wheel 40. Accordingly, the user of the mobile device 10 may automatically preclude the sensor navigation signal from altering the relative position of the graphical element 24 by continuously actuating the thumb wheel 40.

Figure 3:
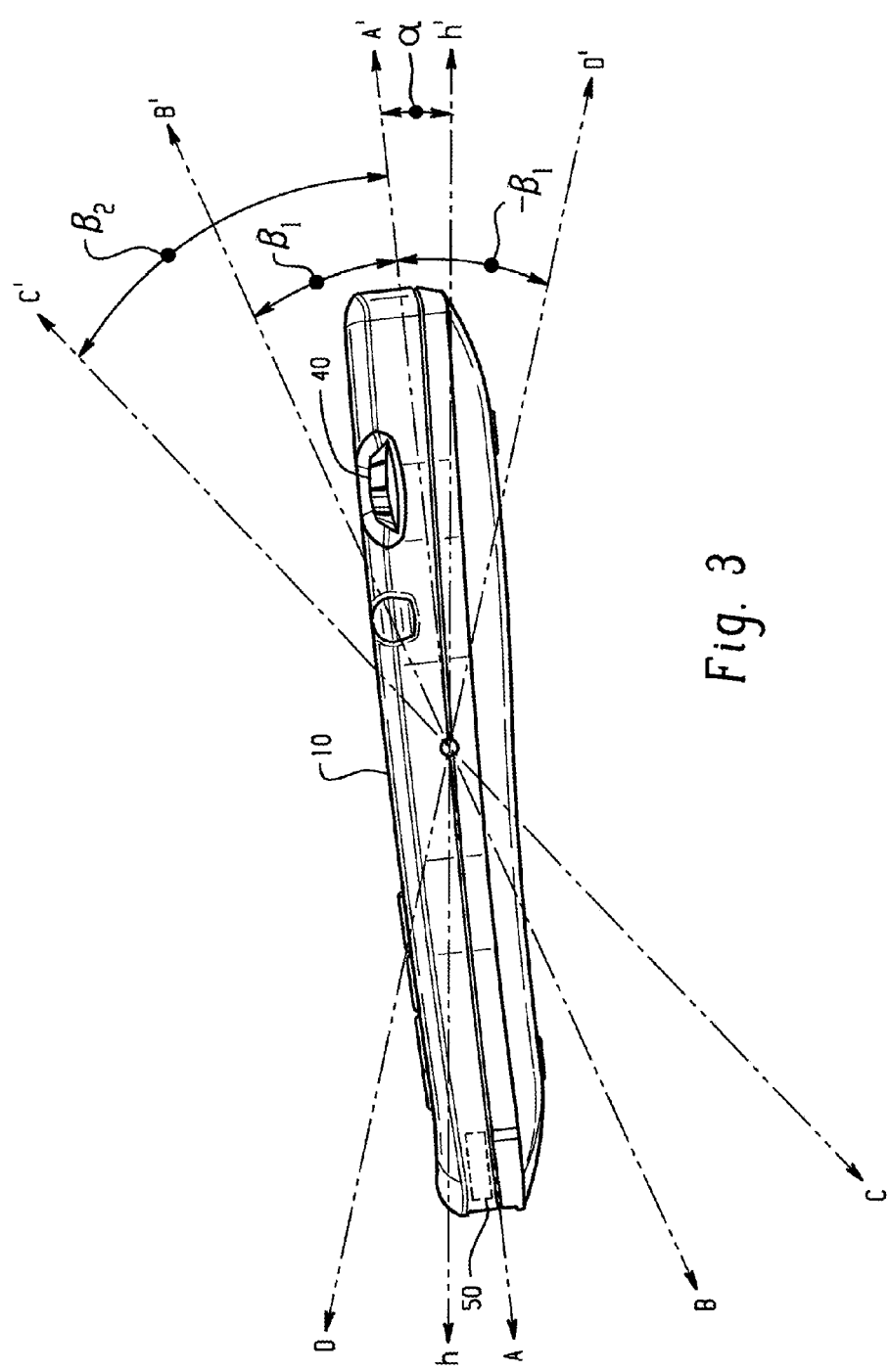
FIG. 3 depicts relative tilt angles of the mobile device.

Manipulating the relative position of the graphical element 24 within the graphical user interface 22 via the sensor 50 may be better understood with reference to FIG. 3, which depicts relative tilt angles of the mobile device 10. The axis hh' defines a true horizontal. The plane of the mobile device 10 is aligned with an axis AA', and an angle $\alpha$ is defined by the angular deflection of the axis AA' from the horizontal axis hh'. The sensor 50 may be mounted within the mobile device 10 so that it generates a null value indicative of zero angular deflection when the axis AA' is aligned with the axis hh'.

In the embodiment of FIG. 3, the sensor 50 senses the current tilt angle of the mobile device 10 relative to the horizontal axis hh'. Actuation of the thumb wheel 40 generates an input navigation signal that may cause the graphical element 24 to change position in the graphical user interface 22. Each time the input navigation signal is generated, the current tilt angle $\alpha$ of the mobile device 10 is stored as a reference tilt signal. Thereafter, a delta tilt signal is obtained by measuring the difference between the current tilt signal $\alpha$ and the reference tilt signal.

To alter the relative position of the graphical element 24 in the graphical user interface 22, the user tilts the mobile device 10 to increase or decrease the value of the delta tilt signal. For example, if the thumb wheel 40 is actuated when $\alpha$ is +10°, the value of the reference tilt signal will be +10°. To thereafter cause the graphical element 24 to scroll upward, the mobile device 10 may be rotated beyond a threshold angle $\beta_1$ relative to the reference tilt angle; likewise, to cause the graphical element 24 to scroll downward, the mobile device 10 may be rotated beyond a threshold angle $-\beta_1$ relative to the reference tilt angle. Assuming $\beta_1$ is $30_o$, then the graphical element 24 will scroll upward when the delta tilt signal indicates that the mobile device 10 is rotated 40° (40°−$\alpha$=$\beta_1$) from the true horizontal hh', and will scroll downward when the mobile device 10 is rotated −20° (−20°−$\alpha$=−$\beta_1$) from the true horizontal hh'. Rotating the mobile device 10 to an angle between 40° and −20° relative to the horizontal axis hh' will cause the graphical element 24 to remain in a fixed position.

In another embodiment, the rate of altering of the relative position of the graphical element 24 may be altered based on a plurality of threshold values. For example, if the mobile device 10 is rotated beyond a first threshold value $\beta_1$, then the graphical element 24 may scroll upward at a first scroll rate. Rotating the mobile device 10 beyond a second threshold value $\beta_2$, however, may cause the graphical element 24 to scroll upward at a second scroll rate that is faster than the first scroll rate.

In addition to monitoring the current tilt angle relative to a single axis as shown in FIG. 3, the sensor 50 and processing subsystem of the mobile device 10 may be further configured to monitor the current tilt angle of the mobile device 10 relative to two- or three axes, and the relative position of the graphical element 24 within the graphical user interface 22 may be manipulated in two dimensions. For example, a graphical element in a spread sheet, such as a selection box, may be moved relative to both columns and rows by tilting the mobile device 10 forward and backwards and side-to-side.

Finally, if the user of the mobile device 10 does not desire to alter the position of the graphical element 24 based on the tilt angle, the user may selectively disable this function. Alternatively, the user may simply continue to actuate the thumb wheel 40, which, in turn, continuously updates the reference tilt angle. By continually updating the reference tilt angle, the delta tilt angle will typically stay within the threshold values $\beta_1$ and $-\beta_1$.

Figure 4:
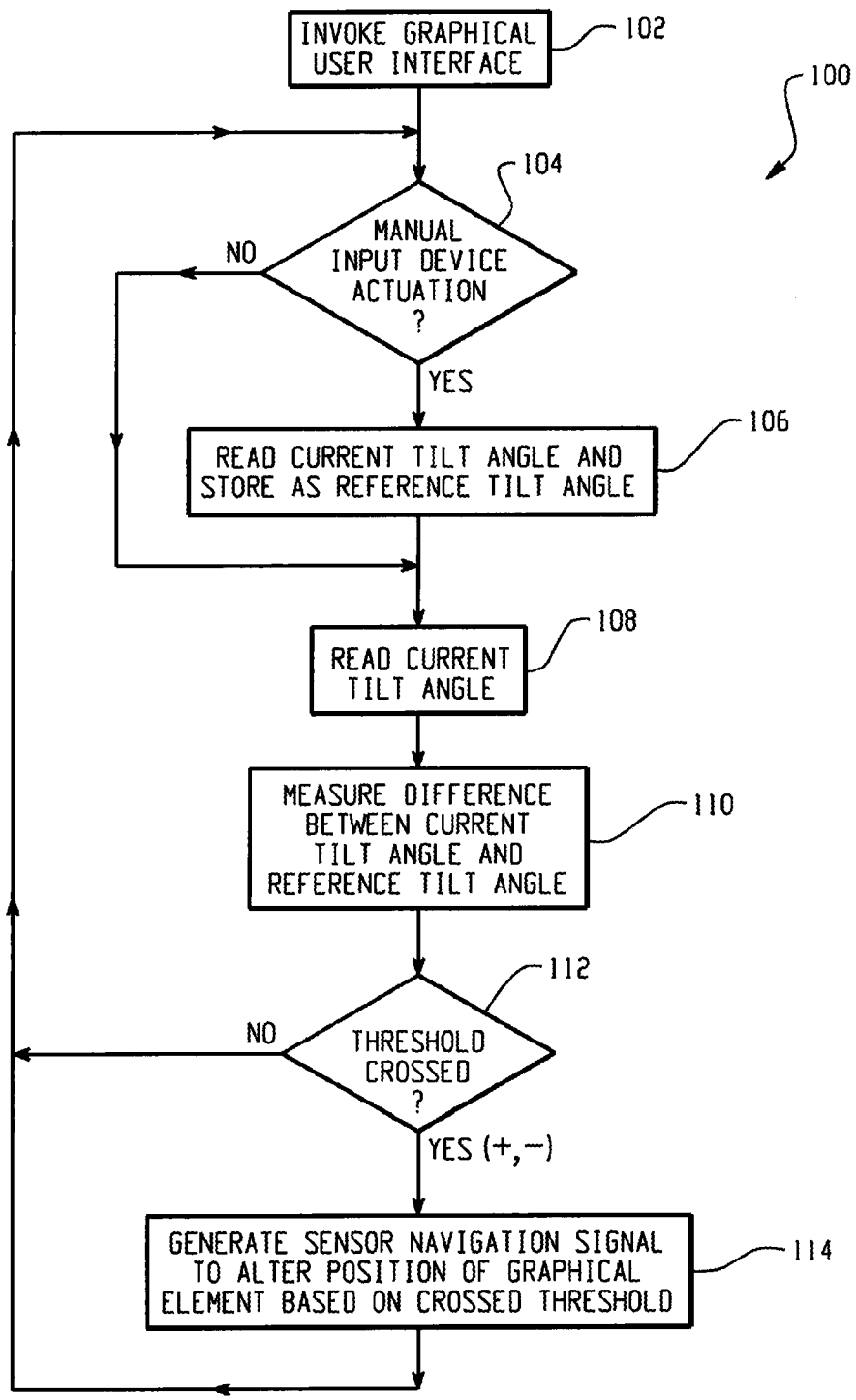
FIG. 4 is a flow chart illustrating a process of manipulating a graphical element in the mobile device graphical user interface based on a tilt angle.

FIGS. 4-8 are flow charts illustrating example processes of manipulating the graphical element 24 in the mobile device 10 graphical user interface 22 based on measurements related to the tilt angle of the mobile device 10. In particular, FIG. 4 is a flow chart 100 illustrating a process of manipulating a graphical element in a mobile device graphical user interface based on a tilt angle. In step 102, a graphical user interface is invoked in which the relative position of a graphical element may be changed in the graphical user interface.

Step 104 monitors if a manual input navigation device has been actuated. If so, then step 106 reads the current tilt angle provided by a sensing device and stores the current tilt angle as a reference tilt angle. After step 106, or upon step 104 determining that a manual input navigation device has not been actuated, step 108 reads the current tilt angle of the mobile device, and step 110 measures the difference between the current tilt angle and the reference tilt angle to determine the delta tilt angle.

After the delta tilt angle in step 110 is determined, step 112 determines if the delta tilt angle has crossed a threshold. A threshold may be crossed either positively or negatively, such as the delta tilt angle exceeding a threshold angle or falling below a threshold angle, respectively.

If a threshold has not been crossed, then the process returns to step 104. If, however, a threshold has been crossed, then step 114 generates a sensor navigation signal to alter the position of the graphical element based on the crossed threshold. For example, if the first threshold $\beta_1$ of FIG. 3 is positively crossed, then the generated sensor navigation signal may cause the graphical element to scroll up a list of data at a first rate. If upon a subsequent execution of step 114 it is determined that the second threshold $\beta_2$ is positively crossed, then generated sensor navigation signal may cause the graphical element to scroll up a list of data at a second rate. Finally, if step 114 later determines that the first threshold $\beta_1$ of FIG. 3 is negatively crossed, then the generated sensor navigation signal may cause the graphical element to stop scrolling.

In one embodiment, hysteresis is implemented to preclude cycling of the sensor navigation signal when the mobile device is rotated beyond a threshold. The hysteresis may be implemented by decreasing a threshold value upon the delta tilt value exceeding the threshold value, and increasing the threshold value upon the delta tilt value falling below the threshold value. For example, if a threshold value $\beta$ is 30°, it may be decreased to 20° upon being positively crossed by the delta tilt value. Thereafter, when the delta tilt value falls below 20°, the threshold value $\beta$ may be increased back to 30°.

The process of FIG. 4 continues until the graphical user interface is exited. The graphical user interface may be exited by selecting a particular data element, exiting a program, or by some other process step.

Figure 5:
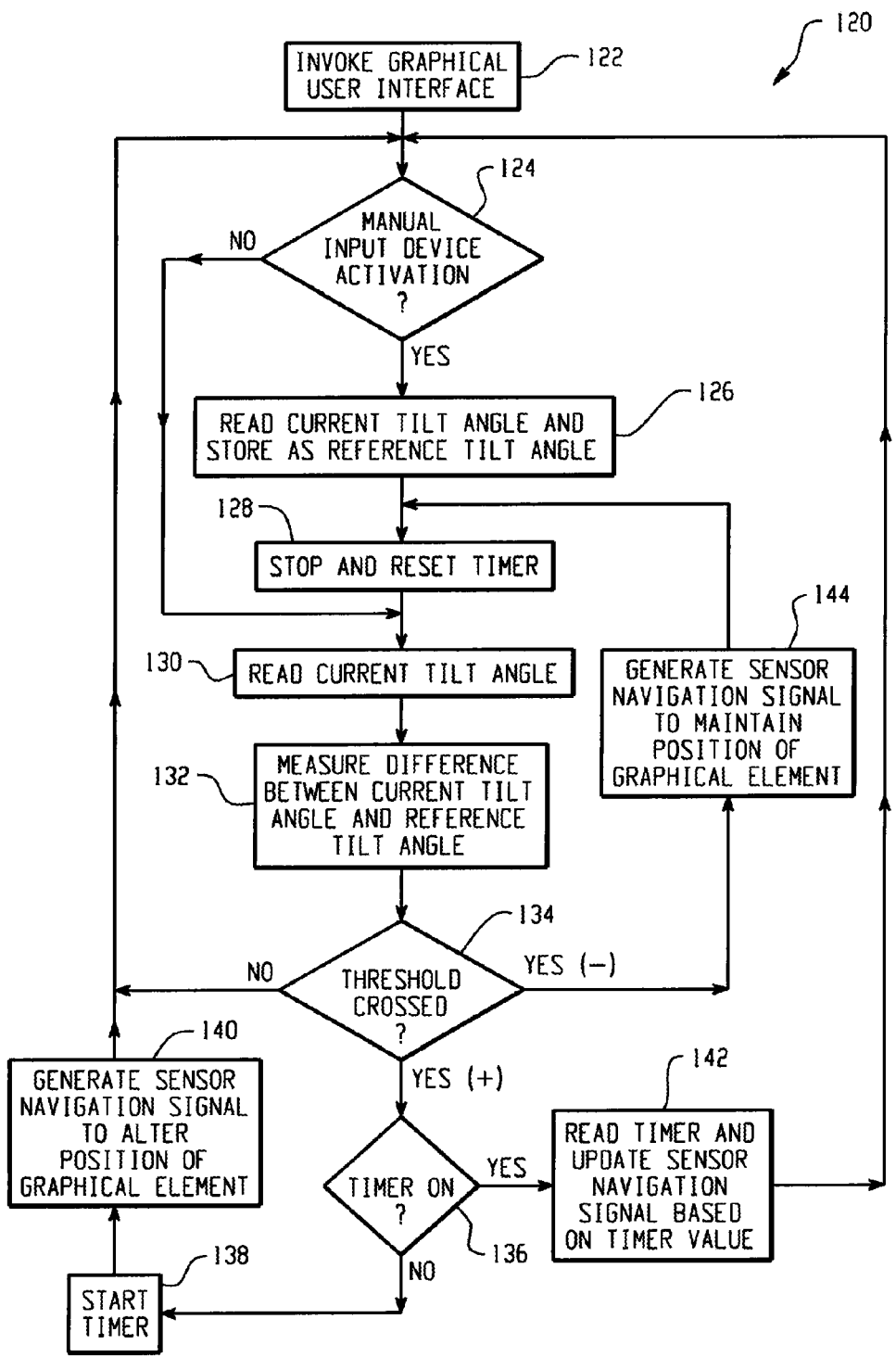
FIG. 5 is a flow chart illustrating a process of manipulating the graphical element in the mobile device graphical user interface based on the tilt angle and a time duration.

FIG. 5 is a flow chart 120 illustrating a process of manipulating the graphical element in the mobile device graphical user interface based on a tilt angle and a time duration. In the example process of FIG. 5, the rate of altering of the relative position of the graphical element is adjusted in proportion to the value of the time counter.

In step 122, a graphical user interface is invoked in which the relative position of a graphical element may be changed in the graphical user interface. Step 124 monitors if a manual input navigation device has been actuated. If so, then step 126 reads the current tilt angle provided by a sensing device and stores the current tilt angle as a reference tilt angle. Step 128 then stops and resets a timer.

After step 128, or upon step 124 determining that a manual input navigation device has not been actuated, step 130 reads the current tilt angle of the mobile device, and step 132 measures the difference between the current tilt angle and the reference tilt angle to determine the delta tilt angle.

After the delta tilt angle in step 132 is determined, step 134 determines if the delta tilt angle has crossed a threshold. A threshold may be crossed either positively or negatively, such as the delta tilt angle exceeding a threshold angle or falling below a threshold angle, respectively.

If step 134 determines that a threshold has not been crossed, then the process returns to step 124. If, however, step 134 determines that a threshold has been positively crossed, then step 136 determines if the timer is on. If step 136 determines that the timer is not on, then step 138 starts the timer, which begins to count from an initial value. After step 138, step 140 generates a sensor navigation signal to alter the position of the graphical element. The sensor navigation signal generated in step 140 sets the rate of altering of the relative position of the graphical element at an initial value. This initial value may be a relatively slow scroll rate. The process then returns to step 124.

Returning to step 136, if it is determined that the timer is on, then step 142 reads the timer and updates the sensor navigation signal based on the timer value. In one embodiment, the sensor navigation signal may be updated so that the scroll rate increases in a near-continuous manner. In another embodiment, the sensor navigation signal may be updated so that the scroll rate increases incrementally based on a time duration, e.g., the relative scroll rate may be initially set at 1.0, and may be increased by a relative rate of 1.0 every 1.0 seconds. Other functions of altering of the relative position of the graphical element over time may also be used.

Returning to step 134, if it is determined that a threshold is negatively crossed, then the step 144 generates a sensor navigation signal to maintain the position of the graphical element. The process then returns to step 128, and the timer is stopped and reset to an initial value.

The process of FIG. 5 has been described with respect to a particular threshold. In another embodiment, step 134 and subsequent steps may be modified to determine whether a positive threshold or a negative threshold, such as $\beta_1$ and $-\beta_1$ of FIG. 3, has been crossed. Based on this determination, the relative position of a graphical element may be changed in first and second directions, respectively, at rates based on the timer values. Additionally, hysteresis may also be implemented as described with reference to FIG. 4.

The process of FIG. 5 continues until the graphical user interface is exited. The graphical user interface may be exited by selecting a particular data element, exiting a program, or by some other process step.

Figure 6:
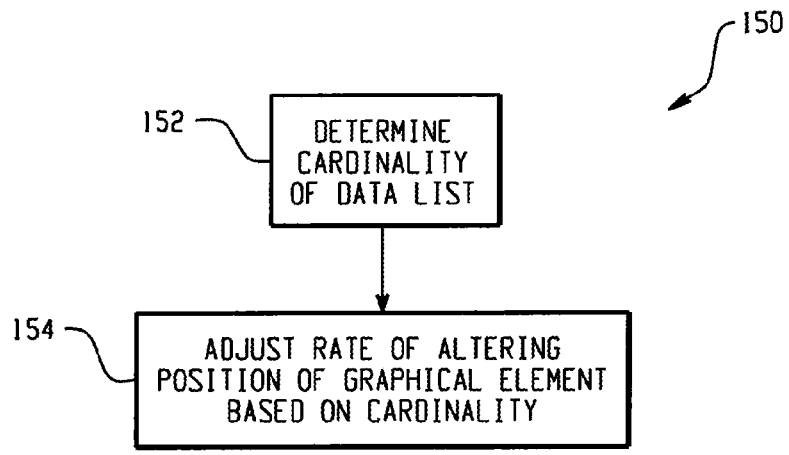
FIG. 6 is a flow chart illustrating a process of adjusting a rate of altering the relative position of the graphical element in the mobile device graphical user interface based on a cardinality of a data list.

FIG. 6 is a flow chart 150 illustrating a process of adjusting a rate of altering of the relative position of the graphical element in the mobile device graphical user interface based on the cardinality of a data list. Step 152 determines the cardinality of a data list. Step 154 adjusts the rate of altering the position of the graphical element based on the cardinality determined in step 152.

The process of FIG. 6 facilitates the navigation of a graphical element through both large and small data collections. For example, a default rate of adjusting the relative position of the graphical element in a list of 50 data elements would be less than the default rate in a list of 5000 data elements.

Figure 7:
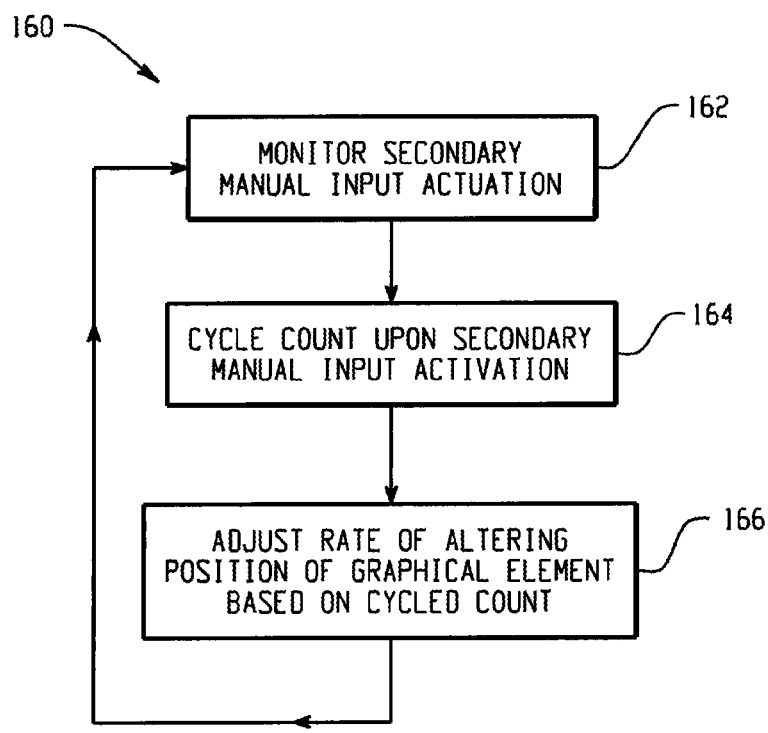
FIG. 7 is a flow chart illustrating a process of adjusting a rate of altering the relative position of the graphical element in the mobile device graphical user interface based on a secondary manual input navigation device.

FIG. 7 is a flow chart 160 illustrating a process of adjusting a rate of altering of the relative position of the graphical element in the mobile device 10 graphical user interface based on a cycled count from a secondary manual input navigation device. A secondary manual input navigation device may comprise another manual input navigation device, such as a key, or may alternatively comprise a separate actuation movement of the first manual input navigation device.

Step 162 monitors for a secondary manual input actuation. When a secondary manual input actuation is detected, step 164 cycles a count value. Finally, in step 166, the rate of altering of the relative position of the graphical element is adjusted based on the cycled count.

Other processing capabilities may also be implemented in addition to or in conjunction with the processes described with respect to FIGS. 1-7 above. For example, a processor may be configured to detect motion patterns in addition to tilting about an axis. One such motion pattern is a flick of the wrist, which results in a rapid fluctuation of the output of the sensor 50. Upon recognizing this pattern, the processor may be configured to alter the position of the graphical element to a beginning or end of a data list. Alternatively, the processor may be configured to perform a page function to page through data upon the detection of a particular motion pattern.

Figure 8:
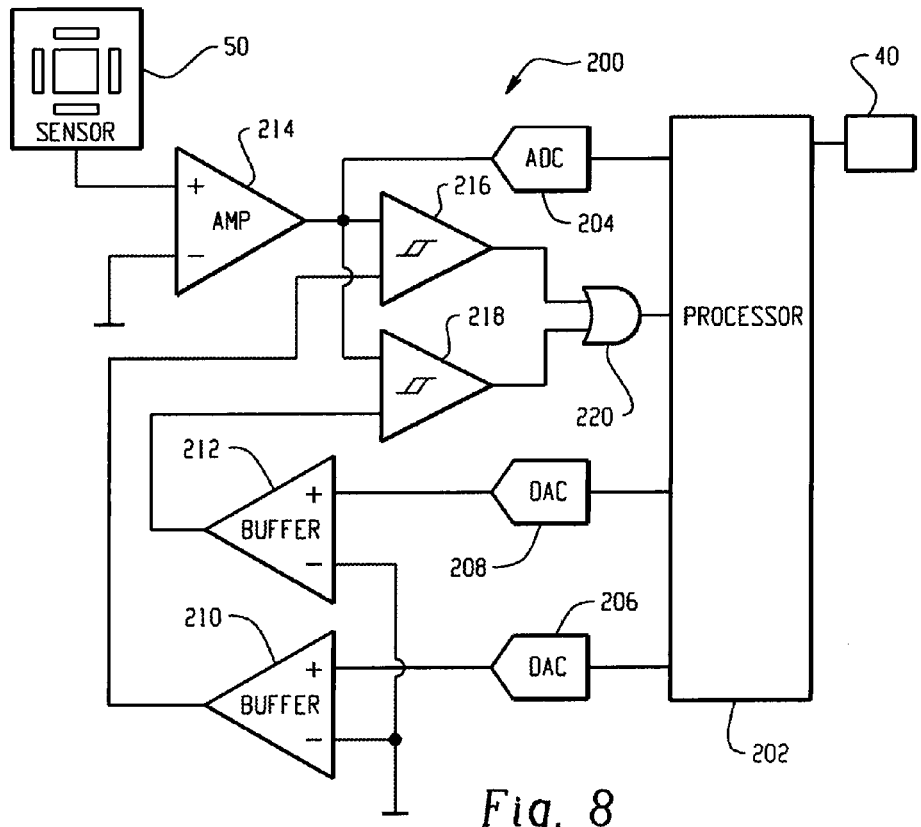
FIGS. 8 and 9 are example circuit implementations for detecting a tilt angle of the mobile device.
Figure 9:
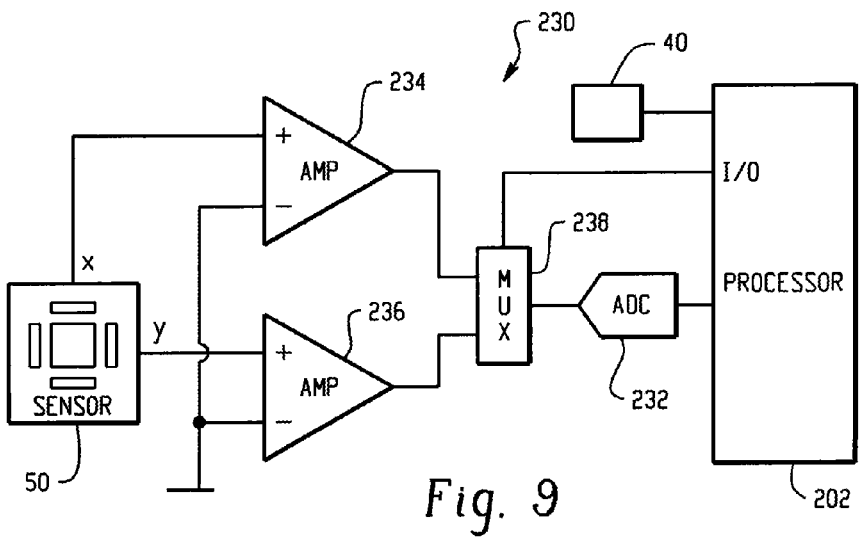

FIGS. 8 and 9 are example circuit implementations for detecting a tilt angle of the mobile device 10. The circuit of FIG. 8 provides hysteresis for a plurality of threshold values. While the circuit of FIG. 8 is described with respect to a single axis, similar circuits may be implemented for other axes of the sensor 50.

The sensor output 50 is provided to an amplifier 214, the output of which, in turn, is provided to an analog-to-digital converter 204 and comparators 216 and 218. The comparators 216 and 218 comprise a window comparator, having lower and upper reference values provided from buffer amplifiers 210 and 212. The OR gate 220 goes high whenever the amplified sensor output value is outside the range defined by the lower and upper reference values of the buffer amplifiers 210 and 212. The buffer amplifiers 210 and 212 buffer the outputs of digital-to-analog converters 206 and 208, respectively. The processor 202 may selectively adjust the output of the digital-to-analog converters 206 and 208 to provide hysteresis when a particular threshold level is crossed.

In operation, actuation of the manual input navigation device 40 generates an input navigation signal. The processor 202 stores the output of the analog-to-digital converter 204 as the current tilt value, and provides the necessary digital signals to digital-to-analog converters 206 and 208 to set the lower and upper values of the window comparator. If the amplified output of the sensor 50 falls outside the range defined by the lower and upper reference values of buffer amplifiers 210 and 212, causing one of the comparators 216 or 218 to go high, then the OR gate 220 likewise goes high.

Upon the output of OR gate 220 going high, the processor 202 reads the output of the analog-to-digital convert 204 and determines whether a threshold has been crossed positively or negatively. Based upon this determination, the inputs to the digital-to-analog converters 206 and 208 are adjusted accordingly.

The circuit of FIG. 9 provides for dual-axis processing of a sensor 50. Amplifiers 234 and 236 amplify sensor 50 outputs corresponding to x-axis and y-axis tilt angles, respectively. The processor 202 monitors the amplifiers 234 and 236 via a multiplexor 238 and an analog-to-digital converter 232.

In operation, actuation of the manual input navigation device 40 generates an input navigation signal. In response, the processor 202 may store an x-axis reference tilt angle and a y-axis reference tilt angle. The processor may then carry out additional processing steps, such as those described with respect to FIGS. 1-7 above.

Other circuitry may also be used in conjunction with the sensor 50. For example, the sensor 50 itself may include processing circuitry and provide a digital output for each sense axis, facilitating a direct link between the sensor and the processor. Additionally, a two-axis or three-axis accelerometer may be used as a sensor. Temperature compensation circuitry and/or processing may also be implemented to adjust for sensor output variations due to temperature sensitivity. Alternatively, the sensor 50 itself may include processing circuitry that compensates for temperature variations. The accelerometer may be a capacitive or piezoresistive element that measures constant acceleration.

Figure 10:
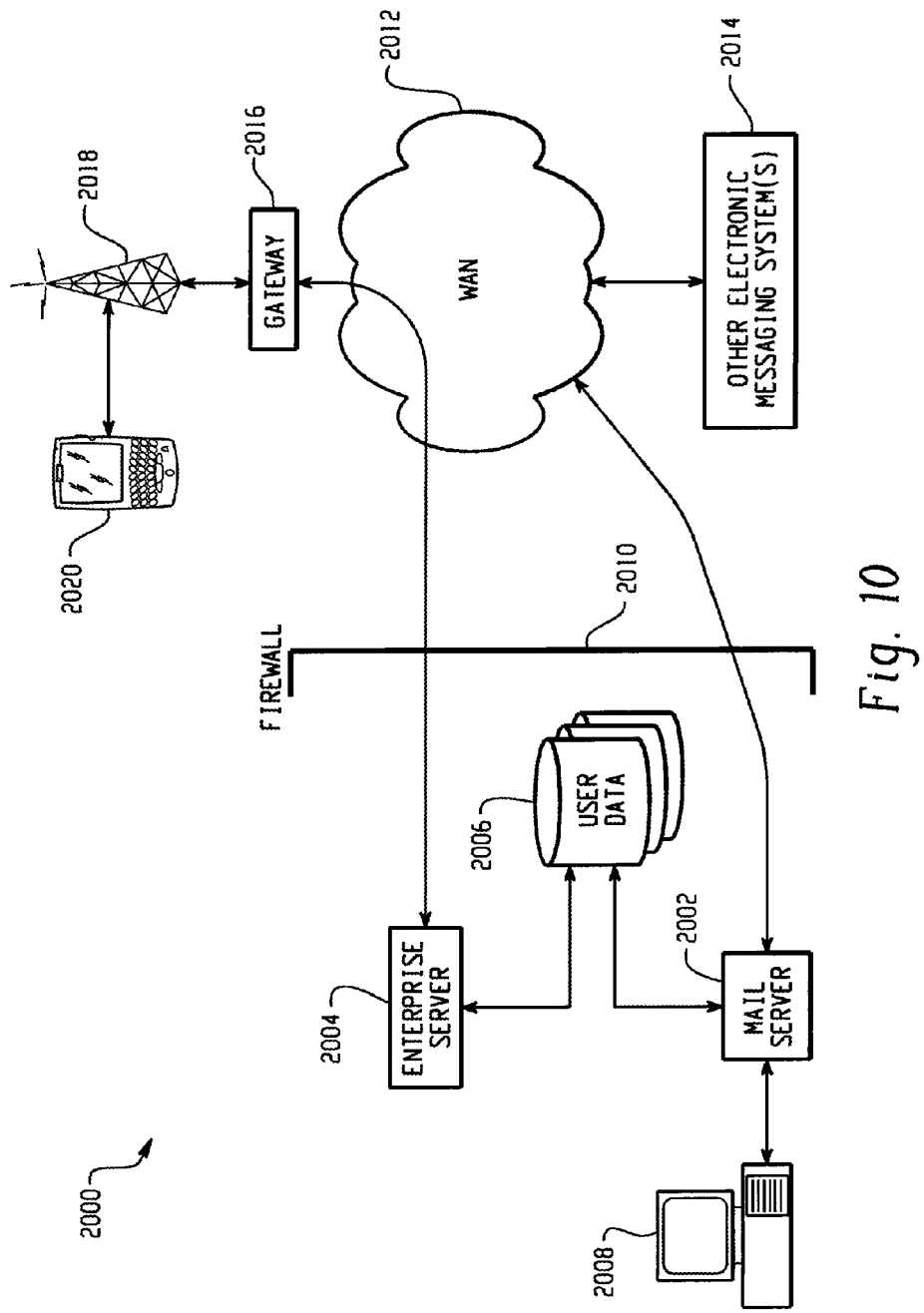
FIG. 10 is a block diagram of an example system for redirecting electronic messages to and from a mobile communication device.

FIG. 10 is a block diagram of an example system 2000 for redirecting electronic messages to and from a mobile communication device 2020. The mobile communication device 2020 may incorporate the graphical user interface navigation systems and methods described with reference to FIGS. 1-8 above. The example redirection system 2000 includes an enterprise server 2004, a mail server 2002, a storage medium 2006 for electronic messaging (e.g., e-mail) account data, and a wireless gateway 2016. Also illustrated are the mobile communication device 2020, a wireless network 2018, a wide area network (WAN) 2012, a firewall 2010, a desktop client 2008, and one or more other electronic messaging systems 2014.

The mail server 2002 may include electronic messaging software executing on a computer within a local area computer network (LAN). The mail server 2002 is coupled to local network devices 2004, 2006, 2008 via the LAN, and is coupled to remote network devices 2014, 2016 via the WAN 2012. The LAN and WAN 2012 may be separated by a firewall 2010.

The mail server 2002 maintains an electronic message account within the electronic message account database 2006 for each desktop client 2008 in the LAN. The electronic message account database 2006 may be one or more storage devices coupled to the mail server 2002, and may be included within the same network device as the mail server 2002 or in one or more separate devices within the LAN. The desktop client 2008 may be one of a plurality of computers (e.g., personal computers, terminals, laptop computers, or other processing devices) coupled to the mail server 2002 via the LAN that execute electronic messaging software to send and receive electronic messages via the mail server.

Electronic messages sent from the desktop client 2008 are stored by the mail server 2002 in an outgoing message storage location (an "outbox") within a corresponding electronic message account 2006. If the outgoing message is addressed to an electronic message account within the LAN, then the mail server 2002 delivers the message to an incoming message storage location (an "inbox") in the appropriate electronic message account 2006. If the outgoing message is addressed to an electronic message account in another electronic messaging system 2014, however, then the message is delivered via the WAN 2012. Similarly, incoming electronic message addressed to the electronic message account 2006 is received by the mail server 2002 and stored to the electronic message account database 2006 within the appropriate incoming message storage location ("inbox"). The incoming electronic message may then be retrieved from the electronic message account 2006 by the desktop client 2008, or may be automatically pushed to the desktop client 2008 by the mail server 2002.

The enterprise server 2004 may include electronic message redirection software executing on a computer within the LAN. The enterprise server 2004 is operational to redirect electronic messages from the electronic message account 2006 to the mobile communication device 2020 and to place messages sent from the mobile communication device 2020 into the electronic message account 2006 for delivery by the mail server 2002. The enterprise server 2004 stores mobile device information, such as a wireless identification (e.g., a PIN), used to communicate with the mobile communication device 2020. The enterprise server 2004 may, for example, communicate with the mobile communication device 2020 using a direct TCP/IP level connection with the wireless gateway 2016, which provides an interface between the WAN 2012 and the wireless network 2018.

When an electronic message is received in the inbox of the electronic message account 2006, the electronic message is detected by the enterprise server 2004, and a copy of the message and any necessary mobile device information are sent over the WAN 2012 to the wireless gateway 2016. For example, the enterprise server 2004 may encapsulate a copy of the message into one or more data packets along with a wireless identification (e.g., a PIN) for the mobile communication device 2020, and transmit the data packet(s) to the wireless gateway 2016 over a direct TCP/IP level connection. The wireless gateway 2016 may then use the wireless identification and/or other mobile device information to transmit the data packets(s) containing the electronic message over the wireless network 2018 to the mobile communication device 2020.

Electronic messages sent from the mobile communication device 2020 may be encapsulated into one or more data packets along with a network identification for the enterprise server 2004 and then transmitted over the wireless network 2018 to the wireless gateway 2016. The wireless gateway 2016 may use the network identification for the enterprise server 2004 to forward the data packet(s) over the WAN 2012 to the enterprise server 2004, preferably via a direct TCP/IP level connection. Upon receiving the data packet(s) from the wireless gateway 2016, the enterprise server 2004 places the enclosed electronic message into the outbox of the associated electronic message account 2006. The mail server 2002 then detects the electronic message in the outbox and delivers the message, as described above.

Security may be maintained outside of the firewall 2010 by encrypting all electronic messages sent between the enterprise server 2004 and the mobile communication device 2020. For instance, an electronic message to be redirected to the mobile communication device 2020 may be encrypted and compressed by the enterprise server 2004, and the encrypted message may then be encapsulated into one or more data packets for delivery to the mobile communication device 2020. To maintain security, the electronic message may remain encrypted over the entire communication path 2016, 2018, and 2012 from the enterprise server 2004 to the mobile communication device 2020. Similarly, electronic messages sent from the mobile communication device 2020 may be encrypted and compressed by the mobile communication device 2020 before being packetized and transmitted to the enterprise server 2004, and may remain encrypted over the entire communication path 2016, 2018, 2012 from the mobile communication device 2020 to the enterprise server 2004.

In addition, the enterprise server 2004 may include a communication subsystem, a memory subsystem and a processing subsystem. The communication subsystem may be operable to communicate with the wireless gateway 2016 over the WAN 2012. The memory subsystem may be operable to store data and program information. The processing subsystem may be operable to store and retrieve data in the memory subsystem and execute programs stored in the memory subsystem, and to cause the communication subsystem to transmit and receive information over the WAN 2012.

Figure 11:
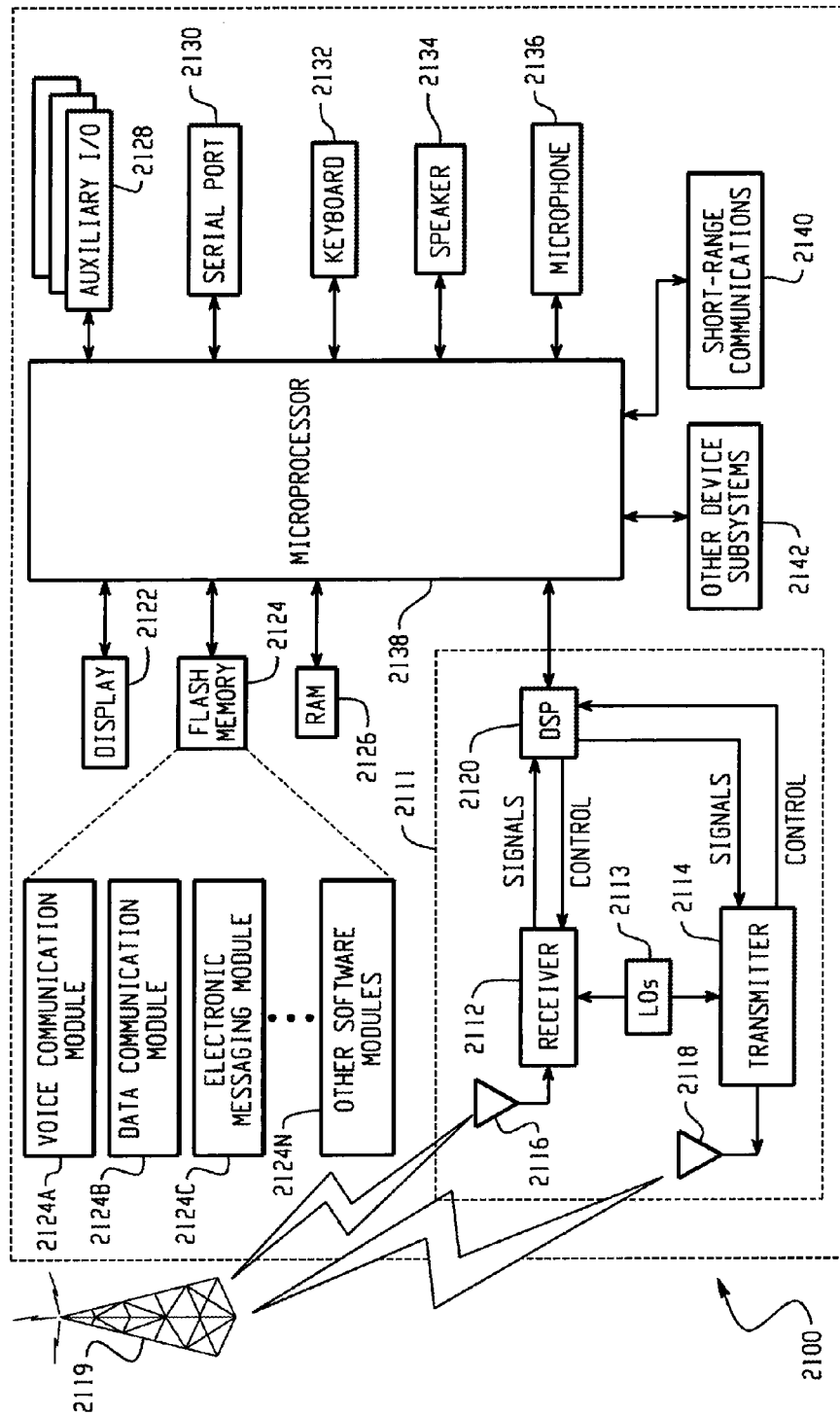
FIG. 11 is a block diagram illustrating an example mobile communication device.

FIG. 11 is a block diagram illustrating an example mobile communication device 2100. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, keyboard 2132, a speaker 2134, a microphone 2136, one or more auxiliary input/output devices 2128, and/or other user interface devices. The graphical user interface systems and methods described with reference to FIGS. 1-8 above may be implemented in the auxiliary I/O 2128, microprocessor 2138, and device subsystems 2142.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

The apparatus, methods, flow diagrams, and structure block diagrams described herein may be implemented in the mobile devices described herein by mobile device program code comprising program instructions that are executable by the mobile device processing subsystem. Other implementations may also be used, however, such as firmware or even appropriately designed hardware configured to carry out the methods and flow diagrams described herein. Additionally, the flow diagrams and structure block diagrams described herein, which describe particular methods and/or corresponding acts in support of steps and corresponding functions in support of disclosed structural means, may also be utilized to implement corresponding software structures and algorithms, and equivalents thereof.

This written description sets forth the best mode of the claimed invention, and describes the claimed invention to enable a person of ordinary skill in the art to make and use it, by presenting examples of the elements recited in the claims. The patentable scope of the invention is defined by the claims themselves, and may include other examples that occur to those skilled in the art. Such other examples, which may be available either before or after the application filing date, are intended to be within the scope of the claims if they have structural elements that do not differ from the literal language of the claims, or if they include equivalent structural elements with insubstantial differences from the literal language of the claims.

The invention claimed is:

1. An electronic device comprising:
a display for displaying a graphical element;
a sensor for determining a tilt angle of the display;
a processor coupled to the display and the sensor and configured to:
move the graphical element relative to the display in a first direction based on a first tilt angle; and
move the graphical element relative to the display in a second direction based on a second tilt angle.

2. The electronic device of claim 1 wherein the first tilt angle relates to forward-backward tilting of the display and the second tilt angle relates to side-to-side tilting of the display.

3. The electronic device of claim 2 wherein the processor alters the position of the graphical element in response to at least one of the first and second tilt angles exceeding a threshold.

4. The electronic device of claim 1 wherein the graphical element's position in the first direction is altered at a rate based on the first tilt angle.

5. The electronic device of claim 1 wherein the graphical element's position in the first direction is altered at a rate based on an amount of time that the first tilt angle has exceeded a threshold.

6. The electronic device of claim 1 wherein the graphical element's position in the first direction is altered at a rate based on a number of different thresholds the first tilt angle has exceeded.

7. The electronic device of claim 1 wherein the processor stores a current first tilt angle as a first reference tilt angle and a current second tilt angle as a second reference tilt angle, relative to which subsequently received first and second tilt angles are compared by the processor.

8. The electronic device of claim 1 wherein the graphical element is a list of items.

9. The electronic device of claim 1 wherein the graphical element is a selection box that designates an item among a list of items displayed by the display.

10. The electronic device of claim 9 wherein the list of items is in the form of a spreadsheet, and the first direction is along columns of the spreadsheet, and the second direction is along rows of the spreadsheet.

11. An electronic device comprising:
a display for displaying a graphical element;
a sensor for determining a tilt angle of the display;
a processor coupled to the display and the sensor and configured to receive a tilt angle signal from the sensor, indicative of a tilt angle, and move the graphical element relative to the display in response to the tilt angle exceeding a threshold.

12. The electronic device of claim 11 wherein, after the tilt angle exceeds the threshold, the graphical element's position is altered at a rate based on the tilt angle.

13. The electronic device of claim 11 wherein, after the tilt angles exceeds the threshold, the graphical element's position is altered at a rate based on an amount of time that the tilt angle has exceeded the threshold.

14. The electronic device of claim 11 wherein, after the tilt angles exceeds the threshold, the graphical element's position is altered at a rate based on a number of different additional thresholds the tilt angle has exceeded.

15. The electronic device of claim 11 wherein the graphical element is a list of items.

16. The electronic device of claim 11 wherein the graphical element is a selection box that designates an item among a list of items displayed by the display.

17. The electronic device of claim 11 wherein the processor stores a current tilt angle as a reference tilt angle, relative to which subsequently received tilt angles are compared by the processor.

18. An electronic device comprising:
a display for displaying a graphical element;
a sensor for determining a tilt angle of the display;
a processor coupled to the display and the sensor and configured to receive a tilt angle signal from the sensor, indicative of a tilt angle, and move the graphical element relative to the display at a rate that is based on a number of thresholds the tilt angle has exceeded.

19. The electronic device of claim 18 wherein the graphical element is a list of items.

20. The electronic device of claim 18 wherein the graphical element is a selection box that designates an item among a list of items displayed by the display.

* * * * *